US009774732B1

(12) United States Patent
Cordell et al.

(10) Patent No.: US 9,774,732 B1
(45) Date of Patent: *Sep. 26, 2017

(54) SCRIPT LOGIC VIEWING

(71) Applicant: ALORICA BUSINESS SOLUTIONS, LLC, Irvine, CA (US)

(72) Inventors: Jeffrey William Cordell, Omaha, NE (US); Jereomy K. Frum, Omaha, NE (US); Gregory Stuart Cardin, Omaha, NE (US); Terry Jay Brooke, Cottage Grove, MN (US)

(73) Assignee: ALORICA BUSINESS SOLUTIONS, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/350,814

(22) Filed: Nov. 14, 2016

Related U.S. Application Data

(63) Continuation of application No. 11/427,008, filed on Jun. 28, 2006, now Pat. No. 9,503,578.

(51) Int. Cl.
  *G06K 9/00* (2006.01)
  *H04M 3/51* (2006.01)
  *G06Q 10/06* (2012.01)

(52) U.S. Cl.
  CPC ........ *H04M 3/51* (2013.01); *G06Q 10/06316* (2013.01)

(58) Field of Classification Search
  CPC ....... H04M 3/51–3/5238; G06Q 30/02; G06Q 10/06
  See application file for complete search history.

(56) References Cited

U.S. PATENT DOCUMENTS

| | | | | |
|---|---|---|---|---|
| 5,239,460 A * | 8/1993 | LaRoche | .......... | G06Q 10/06398 379/265.06 |
| 5,586,175 A * | 12/1996 | Hogan | .................... | H04M 3/42 379/114.14 |
| 5,633,922 A * | 5/1997 | August | .................... | H04Q 3/66 379/211.02 |
| 6,100,891 A * | 8/2000 | Thorne | ................... | H04M 3/51 379/267 |
| 6,144,991 A * | 11/2000 | England | ........... | G06F 17/30873 707/E17.111 |
| 6,175,864 B1 * | 1/2001 | Addison | ............. | G06F 9/45512 707/999.103 |
| 6,449,358 B1 * | 9/2002 | Anisimov | ............... | H04L 29/06 379/266.07 |
| 6,587,556 B1 * | 7/2003 | Judkins | ............... | H04M 3/5233 379/219 |
| 7,136,865 B1 * | 11/2006 | Ra | ........................ | G06F 9/4443 |
| 7,295,668 B2 * | 11/2007 | Singer | ................. | H04M 3/5158 379/265.01 |
| 7,321,298 B2 * | 1/2008 | Judkins | ............... | H04M 3/5233 340/3.1 |
| 7,386,113 B2 * | 6/2008 | Galvin | ................... | G06Q 10/06 379/265.03 |

(Continued)

*Primary Examiner* — Aaron W Carter

(57) ABSTRACT

A system, method, and computer readable medium for script logic viewing that comprises calculating a script path for at least one script, defining an entry point into the at least one script, determining at least one panel associated with the at least one script, creating a navigation file based upon the calculated script path, the defined entry point and the determined at least one panel, and presenting the created navigation file.

19 Claims, 6 Drawing Sheets

(56) References Cited

U.S. PATENT DOCUMENTS

| | | | | |
|---|---|---|---|---|
| 7,584,283 | B2* | 9/2009 | Ra | G06Q 10/06 709/227 |
| 7,765,165 | B2* | 7/2010 | Malden | G06Q 30/016 705/304 |
| 8,364,509 | B1* | 1/2013 | Marr | G06Q 10/0639 705/320 |
| 8,595,648 | B1* | 11/2013 | Cordell | G06F 8/34 715/712 |
| 8,644,492 | B1* | 2/2014 | Cordell | H04M 3/523 379/265.01 |
| 9,503,578 | B1* | 11/2016 | Cordell | G06Q 10/06 |
| 2002/0022986 | A1* | 2/2002 | Coker | G06Q 30/02 717/115 |
| 2002/0140731 | A1* | 10/2002 | Subramaniam | G06F 3/0481 715/762 |
| 2003/0018525 | A1* | 1/2003 | Joao | G06Q 30/02 705/14.19 |
| 2003/0041314 | A1* | 2/2003 | Heeren | G06F 8/34 717/109 |
| 2003/0078782 | A1* | 4/2003 | Blair | H04M 3/42221 704/270.1 |
| 2003/0198934 | A1* | 10/2003 | Sendowski | G09B 7/02 434/350 |
| 2005/0002515 | A1* | 1/2005 | Mewhinney | H04M 3/5166 379/266.08 |
| 2005/0086220 | A1* | 4/2005 | Coker | G06Q 30/02 |
| 2005/0216551 | A1* | 9/2005 | Sirstins | H04M 3/493 709/202 |
| 2005/0273384 | A1* | 12/2005 | Fraser | G06Q 10/00 705/14.41 |
| 2006/0062376 | A1* | 3/2006 | Pickford | H04M 3/5183 379/265.12 |
| 2006/0095538 | A1* | 5/2006 | Rehman | H04L 67/14 709/217 |
| 2006/0117222 | A1* | 6/2006 | Shen | G06F 8/31 714/38.14 |
| 2006/0251237 | A1* | 11/2006 | Singer | H04M 3/5158 379/265.05 |
| 2006/0277313 | A1* | 12/2006 | Richer | H04L 63/0815 709/229 |
| 2006/0285656 | A1* | 12/2006 | Saborowski | G06F 8/61 379/67.1 |
| 2006/0291644 | A1* | 12/2006 | Ellinwood | H04M 3/5183 379/265.02 |
| 2007/0121899 | A1* | 5/2007 | Galvin | H04M 3/51 379/265.05 |
| 2007/0208573 | A1* | 9/2007 | Malden | G06Q 30/02 705/304 |
| 2007/0208858 | A1* | 9/2007 | Ra | G06Q 10/06 709/227 |
| 2008/0043959 | A1* | 2/2008 | Singer | H04M 3/5158 379/201.02 |
| 2009/0083246 | A1* | 3/2009 | Coker | G06Q 30/02 |
| 2009/0141885 | A1* | 6/2009 | Blair | H04M 3/42221 379/265.03 |
| 2011/0150206 | A1* | 6/2011 | Pickford | H04M 3/5183 379/265.09 |

* cited by examiner

SCRIPT LOGIC VIEWING

CROSS REFERENCE TO RELATED APPLICATIONS

This application is a continuation of U.S. patent application Ser. No. 11/427,008, filed Jun. 28, 2006, and entitled SCRIPT LOGIC VIEWING, now issued U.S. Pat. No. 9,503,578 issued on Nov. 22, 2016, the entire contents of which is incorporated by reference herein.

BACKGROUND OF THE INVENTION

The present invention is generally related to script logic, and more specifically, to script logic viewing.

To increase call center customer satisfaction, agents must have accurate timely information and must respond quickly. This timely and accurate response by the agent is enabled by continuous flow of information to and from the agent in the form of a script. The script allows the agent to handle objections, answer questions and gather information in an efficient process. The script as a whole is comprised of individual panels which have instructions, information and data queries. This set of panel instructions, information and data queries are referred to as panel logic. The panels themselves are tied together depending upon the questions asked and information required. This panel-to-panel linkage is referred to as branching logic and can tie a large variety of panels together in a dynamic fashion as the need arises. Panels tied together by branching logic form a script path. The design of panel logic and branching logic can be extremely complex and can require much time and effort to debug.

Therefore, what is needed is an ability to efficiently present script logic. More specifically, what is needed is a script logic viewer to provide more efficient debugging of the panels and branching logic. The present invention allows viewing of the script logic associated with a script.

SUMMARY OF THE INVENTION

The present invention is an Integrated Development Environment (IDE) that facilitates the creation of text based scripts that contact center agents read to enable a customer sale or answer a data query. The present invention is preferably utilized via the Internet.

The present invention facilitates data entry required to complete a customer transaction for a client. Various back-end reporting data is captured that includes: agent relevant statistics, call timing (average length of call) and disposition of call (sale/no sale).

Scripts are logical business flows and transactions which are created into scripted panels using the present invention to create web pages and instructions for contact center agents to read and follow. A single business transaction (script) can incorporate hundreds of panels and thousands of logical branches and permutations of flow. These complicated scripts are difficult and time consuming to debug. Script time to market and accuracy of script logic are challenges.

The present invention creates a XML navigation file that represent each script's defined paths, entry points into a script, and their related first panels, as well as HTML and code related to files that are displayed to the user.

In one embodiment of the present invention, a method for script logic viewing comprises calculating a script path for at least one script, defining an entry point into the at least one script, determining at least one panel associated with the at least one script, creating a navigation file based upon the calculated script path, the defined entry point and the determined at least one panel, and presenting the created navigation file. The method may also comprise displaying panel logic for the at least one panel, providing a list of panels subsequent to the at least one panel, demonstrating branching logic of the calculated script path, generating instructions associated with the at least one panel, interfacing data entry into the at least one panel, capturing a statistical data associated with data entry into the at least one script for an agent, reporting the captured statistical data, assessing an average length of a call associated with the at least one script for an agent, communicating the assessed average length of call, determining a disposition of a call associated with the at least one script for an agent, and disclosing the determined call disposition, wherein the navigation file is viewable via the Internet and the navigation file is text based.

In a further embodiment of the present invention, a computer readable medium comprises instructions for calculating a script path for at least one script, defining an entry point into the at least one script, and determining at least one panel associated with the at least one script based on the entry point. The computer readable medium may also comprise instructions for creating a navigation file based upon the calculated script path, the defined entry point and the determined at least one panel, presenting the created navigation file, capturing a statistical data associated with data entry into the at least one script for an agent, reporting the captured statistical data, assessing an average length of a call associated with the at least one script for an agent, communicating the assessed average length of call, determining a disposition of a call associated with the at least one script for an agent, and disclosing the determined call disposition.

In yet another embodiment, a system for script logic viewing comprises a processor, wherein the processor calculates a script path for at least one script, defines an entry point into the at least one script, determines at least one panel associated with the at least one script and creates a navigation file based upon the calculated script path, the defined entry point and the determined at least one panel, and a memory communicably coupled to the processor, wherein the memory stores the navigation file. The processor may also present the created navigation file, display panel logic for the at least one panel, provide a list of panels subsequent to the at least one panel, demonstrate branching logic of the calculated script path, and generate instructions associated with the at least one panel.

DETAILED DESCRIPTION OF THE INVENTION

Figure 1:
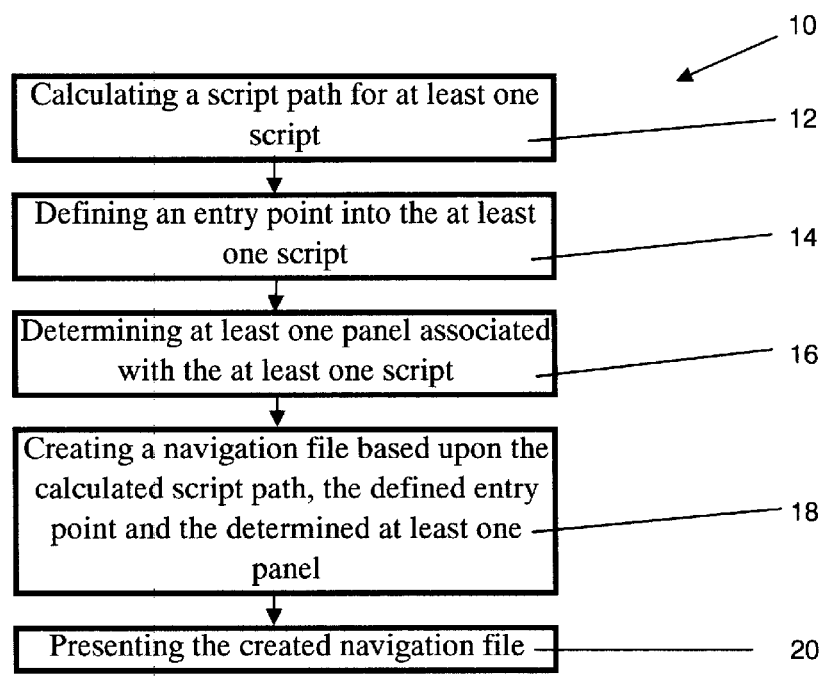
FIG. 1 depicts a first method of script logic viewing in accordance with a preferred embodiment of the present invention.

Referring now to FIG. 1, a first method of script logic viewing 10 is depicted. The method for script logic viewing comprises calculating 12 a script path for at least one script, defining 14 an entry point into the at least one script, determining 16 at least one panel associated with the at least one script, creating 18 a navigation file based upon the calculated script path, the defined entry point and the determined at least one panel, and presenting 20 the created navigation file. The method is performed by software, hardware, or firmware, and/or the combination of software, hardware, and/or firmware.

Figure 2:
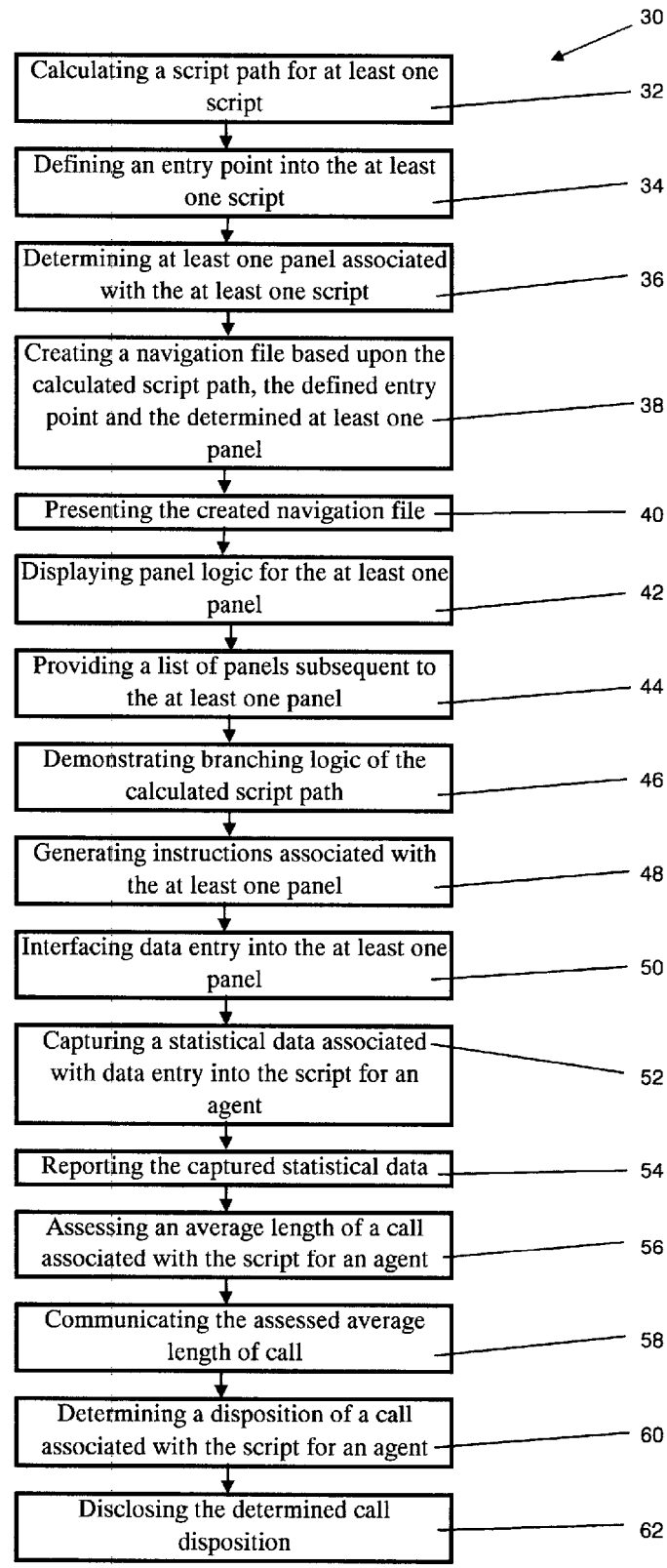
FIG. 2 depicts a second method of script logic viewing in accordance with a preferred embodiment of the present invention.

Referring now to FIG. 2, a second method of script logic viewing 30 is depicted. The method for script logic viewing comprises calculating 32 a script path for at least one script, defining 34 an entry point into the at least one script, determining 36 at least one panel associated with the at least one script, creating 38 a navigation file based upon the calculated script path, the defined entry point and the determined at least one panel, and presenting 40 the created navigation file. The method may also comprise 42 displaying panel logic for the at least one panel, providing 44 a list of panels subsequent to the at least one panel and demonstrating 46 branching logic of the calculated script path. The method may additionally comprise generating 48 instructions associated with the at least one panel, interfacing 50 data entry into the at least one panel, capturing 52 a statistical data associated with data entry into the at least one script for an agent and reporting 54 the captured statistical data. The method may also comprise assessing 56 an average length of a call associated with the at least one script for an agent, communicating 58 the assessed average length of call, determining 60 a disposition of a call associated with the at least one script for an agent and disclosing 62 the determined call disposition. The navigation file is viewable via the Internet and the navigation file is text based. The method is performed by software, hardware, or firmware, and/or the combination of software, hardware, and/or firmware.

Figure 3:
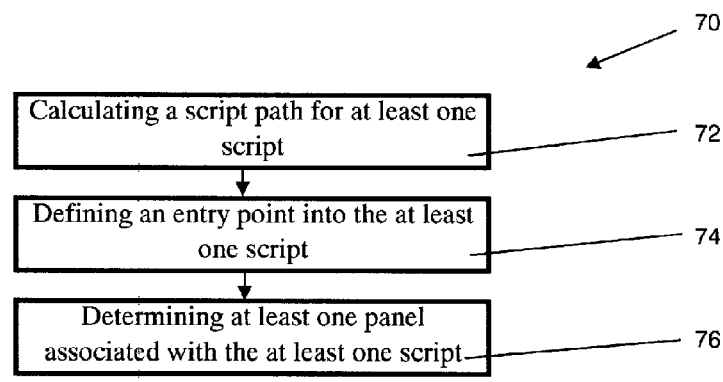
FIG. 3 depicts a first software flow block of script logic viewing in accordance with a preferred embodiment of the present invention.

Referring now to FIG. 3, a first software flow block of script logic viewing 70 is depicted. The first computer readable medium comprises instructions for, calculating 72 a script path for at least one script, defining 74 an entry point into the at least one script and determining 76 at least one panel associated with the at least one script. These steps are preferably embodied in a computer readable medium or software but may also be embodied in firmware and is utilized via hardware. The transfer of information occurs via at least one of a wireless protocol, a wired protocol and the combination of the wireless protocol and the wired protocol. The steps performed in this figure are performed by software, hardware, or firmware, and/or the combination of software, hardware, and/or firmware.

Figure 4:
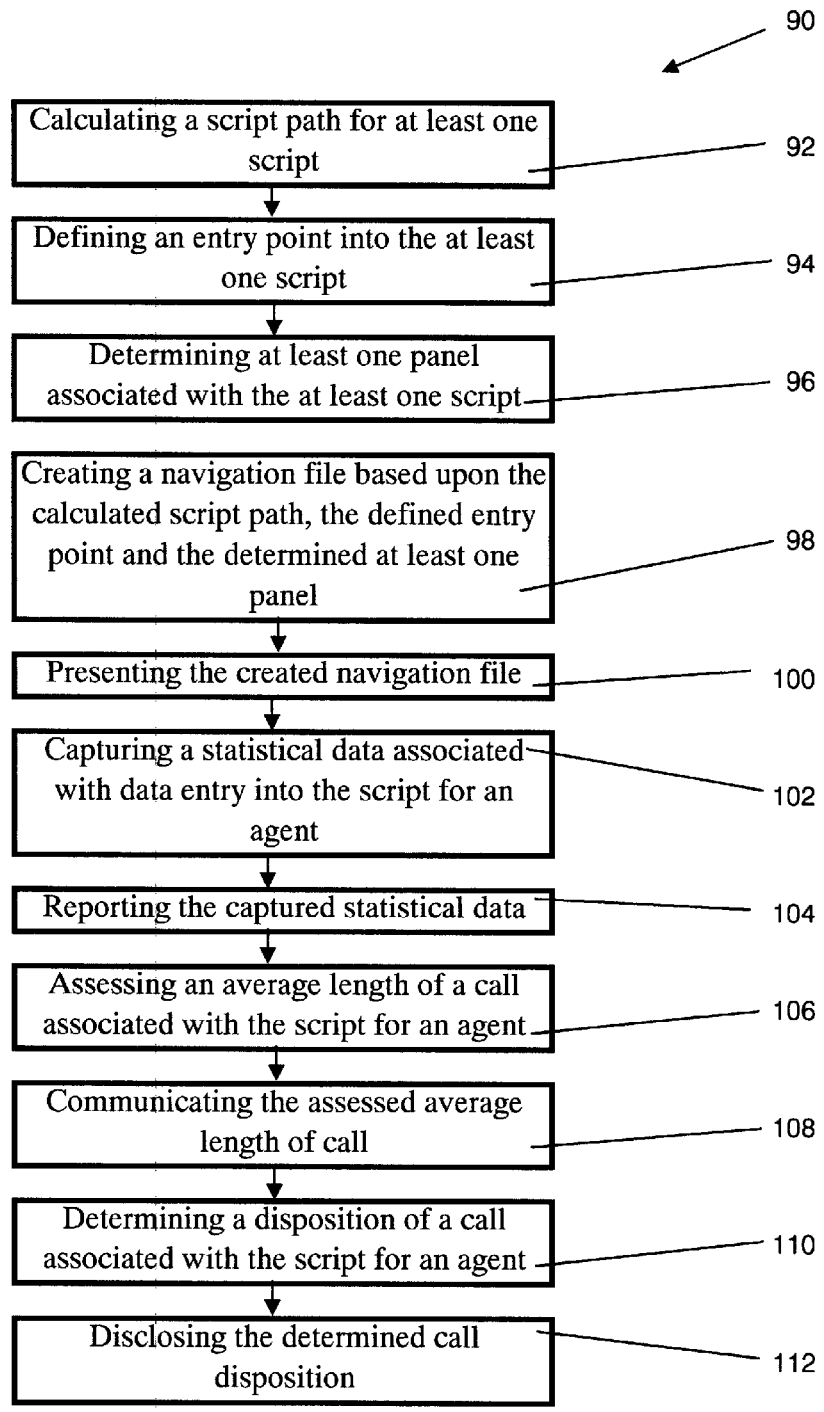
FIG. 4 depicts a second software flow block of script logic viewing in accordance with a preferred embodiment of the present invention.

Referring now to FIG. 4, a second software flow block of script logic viewing 90 is depicted. The computer readable medium comprises instructions for calculating 92 a script path for at least one script, defining 94 an entry point into the at least one script, and determining 94 at least one panel associated with the at least one script. The computer readable medium may also comprise instructions for creating 98 a navigation file based upon the calculated script path, the defined entry point and the determined at least one panel, presenting 100 the created navigation file, capturing 102 a statistical data associated with data entry into the at least one script for an agent and reporting 104 the captured statistical data. The computer readable medium may also comprise instructions for assessing 106 an average length of a call associated with the at least one script for an agent, communicating 108 the assessed average length of call, determining 110 a disposition of a call associated with the at least one script for an agent and disclosing 112 the determined call disposition. These steps are preferably embodied in a computer readable medium or software but may also be embodied in firmware and is utilized via hardware. The transfer of information occurs via at least one of a wireless protocol, a wired protocol and the combination of the wireless protocol and the wired protocol. The steps performed in this figure are performed by software, hardware, or firmware, and/or the combination of software, hardware, and/or firmware.

Figure 5:
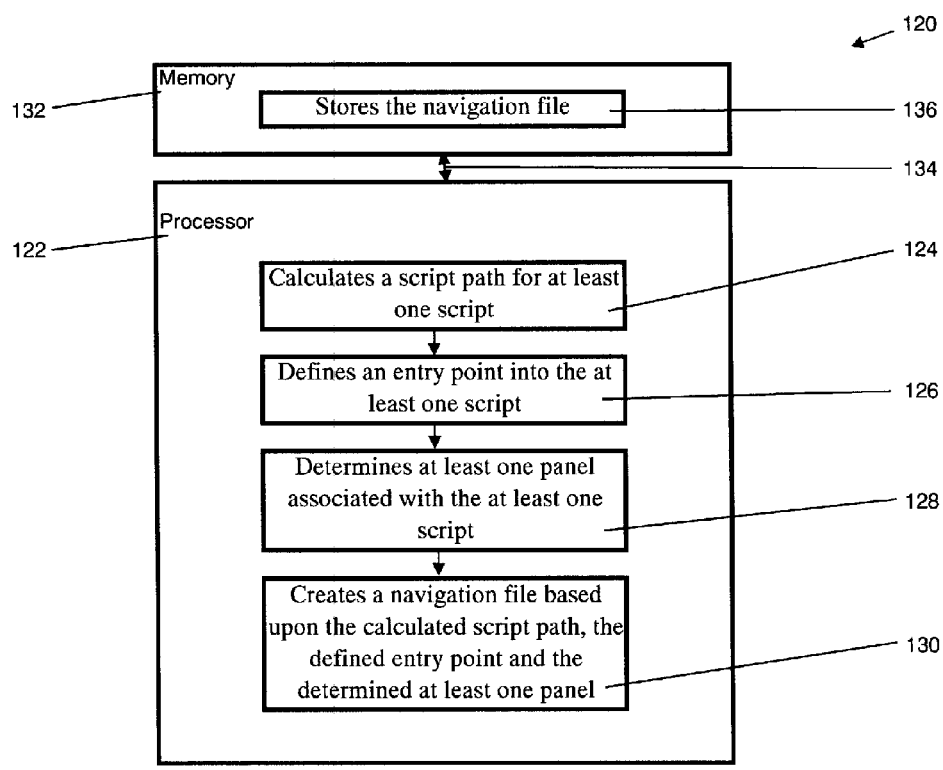
FIG. 5 depicts a first system of script logic viewing in accordance with a preferred embodiment of the present invention.

Referring now to FIG. 5, a first system of script logic viewing 120 is depicted. The system comprises a processor 122, wherein the processor calculates 124 a script path for at least one script, defines 126 an entry point into the at least one script, determines 128 at least one panel associated with the at least one script and creates 130 a navigation file based upon the calculated script path, the defined entry point and the determined at least one panel, and a memory 132 communicably coupled 134 to the processor, wherein the memory stores 136 the navigation file. The transfer of information between the processor and the memory occurs via at least one of a wireless protocol, a wired protocol and a combination of a wireless protocol and a wired protocol. The steps performed in this figure are performed by software, hardware, or firmware, and/or the combination of software, hardware, and/or firmware.

Figure 6:
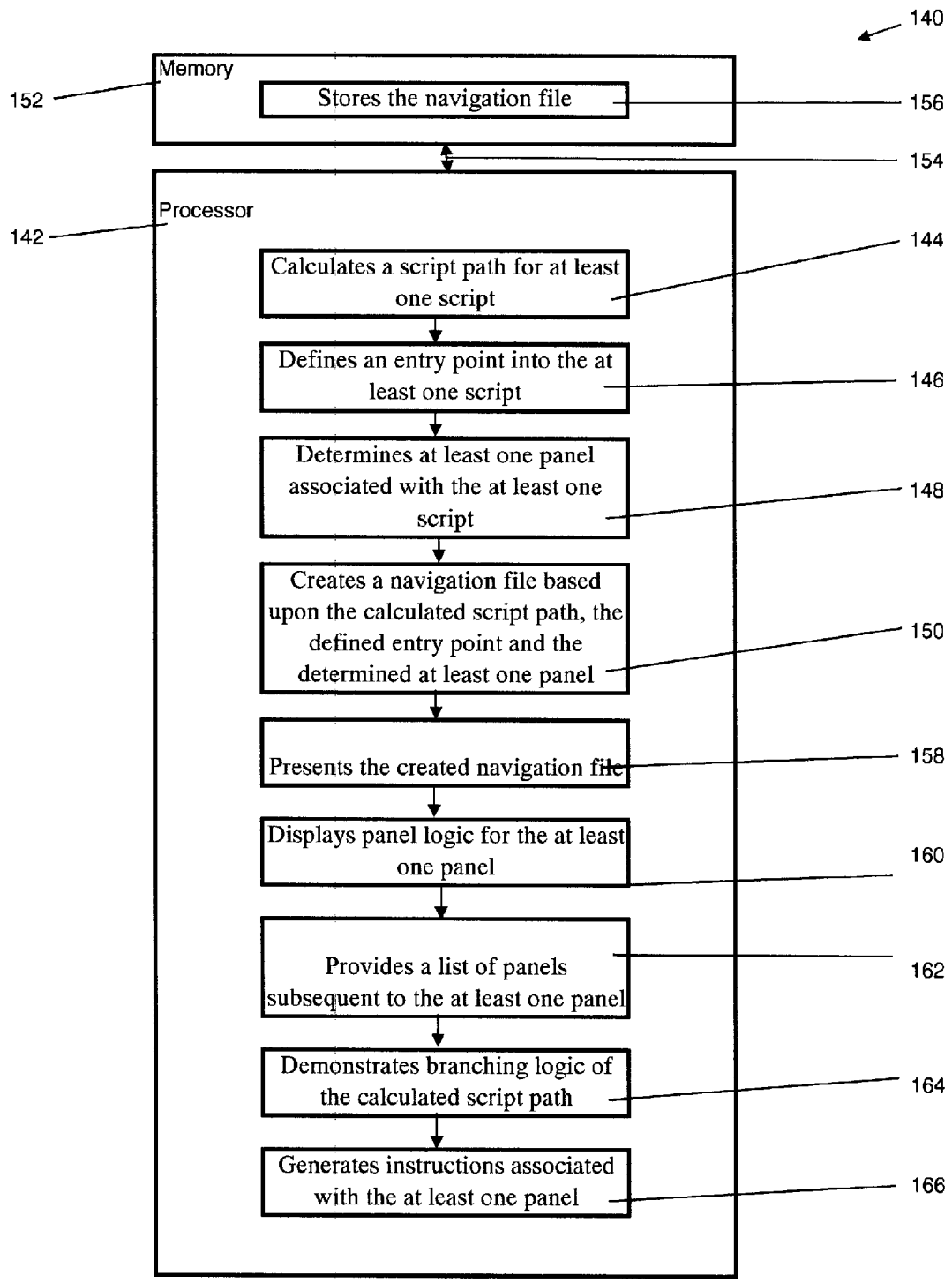
FIG. 6 depicts a system of script logic viewing in accordance with a preferred embodiment of the present invention.

Referring now to FIG. 6, a second system of script logic viewing 140 is depicted. The system comprises a processor 142, wherein the processor calculates 144 a script path for at least one script, defines 146 an entry point into the at least one script, determines 148 at least one panel associated with the at least one script and creates 150 a navigation file based upon the calculated script path, the defined entry point and the determined at least one panel, and a memory 152 communicably coupled 154 to the processor, wherein the memory stores 156 the navigation file. The processor may also present 158 the created navigation file, display 160 panel logic for the at least one panel, provide 162 a list of panels subsequent to the at least one panel, demonstrate 14 branching logic of the calculated script path, and generate 166 instructions associated with the at least one panel. The transfer of information between the processor and the memory occurs via at least one of a wireless protocol, a wired protocol and a combination of a wireless protocol and a wired protocol. The steps performed in this figure are performed by software, hardware, or firmware, and/or the combination of software, hardware, and/or firmware.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the processors or memories. Also, these capabilities may be performed in the current manner or in a distributed manner and on, or via, any device able to provide and/or receive data. Further, although depicted in a particular manner, various modules or blocks may be repositioned without departing from the scope of the current invention. Still further, although depicted in a particular manner, a greater or lesser number of processors, memories and connections can be utilized with the present invention in order to accomplish the present invention, to provide additional known features to the present invention, and/or to make the present invention more efficient.

What is claimed is:

1. A method, comprising:
   defining an entry point into each script of a plurality of scripts;
   determining at least two panels associated with each script of the plurality of scripts, wherein the at least two panels comprise instructions, information, and data queries;
   creating a navigation file comprising defined paths of each script of the plurality of scripts, related first panels of each script, and HTML and code related to files;
   presenting the created navigation file to a call agent via a graphical user interface of a script logic viewer, wherein the script logic viewer shows script logic associated with the script, and the script logic comprises individual panels tied together by branching logic; and
   disclosing a determined disposition of a call associated with at least one script of the plurality of scripts, wherein the disposition of the call comprises whether a sale was made;
   wherein the navigation file is an XML navigation file.

2. The method of claim 1 comprising displaying panel logic for the at least two panels.

3. The method of claim 1 comprising providing a list of additional panels in addition to the at least two panels.

4. The method of claim 1 comprising demonstrating branching logic of the calculated script path.

5. The method of claim 1 comprising generating instructions associated with the at least two panels.

6. The method of claim 1 comprising interfacing data entry into the at least two panels.

7. The method of claim 1 comprising:
   capturing statistical data associated with a data entry entered into the at least one script of the plurality of scripts for the call agent; and
   reporting the captured statistical data.

8. The method of claim 1 comprising:
   assessing an average length of a call associated with the at least one script of the plurality of scripts for the call agent; and
   communicating the assessed average length of call.

9. The method of claim 1 comprising determining the disposition of the call associated with at least one script of the plurality of scripts for the call agent, wherein the disposition is determined by a computing system.

10. The method of claim 1 wherein, the navigation file is viewable via the Internet.

11. The method of claim 1 wherein, the navigation file is text based.

12. A non-transitory computer readable storage medium, storing instructions that, when executed, cause a processor to perform:
    defining an entry point into each script of a plurality of scripts;
    determining at least two panels associated with each script of the plurality of scripts, wherein the at least two panels comprise instructions, information, and data queries;
    creating a navigation file comprising defined paths of each script of the plurality of scripts, related first panels of each script, and HTML and code related to files;
    presenting the created navigation file to a call agent via a graphical user interface of a script logic viewer, wherein the script logic viewer shows script logic associated with the script, and the script logic comprises individual panels tied together by branching logic; and
    disclosing a determined disposition of a call associated with at least one script of the plurality of scripts, wherein the disposition of the call comprises whether a sale was made;
    wherein the navigation file is an XML navigation file.

13. The non-transitory computer readable storage medium of claim 12, wherein the instructions further cause the processor to perform determining the disposition of the call associated with at least one script of the plurality of scripts for the call agent, wherein the disposition is determined by a computing system.

14. The non-transitory computer readable storage medium of claim 12, wherein the instructions further cause the processor to perform calculating a script path for each script of the plurality of scripts.

15. The non-transitory computer readable storage medium of claim 12, wherein the instructions further cause the processor to:
    capture statistical data associated with data entry into the at least one script of the plurality of scripts for the call agent; and
    report the captured statistical data.

16. The non-transitory computer readable storage medium of claim 12, wherein the instructions further cause the processor to:
    assess an average length of a call associated with the at least one script of the plurality of scripts for the call agent; and
    communicate the assessed average length of call.

17. A system, comprising:
    a processor configured to:
        define an entry point into each script of a plurality of scripts,
        determine at least two panels associated with each script of the plurality of scripts, wherein the at least two panels comprise instructions, information, and data queries,
        create a navigation file comprising defined paths of each script of the plurality of scripts, related first panels of each script, and HTML and code related to files,
        present the created navigation file to a call agent via a graphical user interface of a script logic viewer, wherein the script logic viewer shows script logic associated with the script, and the script logic comprises individual panels tied together by branch logic, and
        disclose a determined disposition of a call associated with at least one script of the plurality of scripts, wherein the disposition of the call comprises whether a sale was made; and
    memory communicably coupled to the processor, wherein the memory stores the navigation file;
    wherein the navigation file is an XML navigation file.

18. The system of claim 17 wherein the processor is further configured to display panel logic for the at least two panels.

19. The system of claim 17 wherein the processor is further configured to:
- provide a list of panels in addition to the at least two panels;
- demonstrate branch logic of the calculated script path; and
- generate instructions associated with the at least two panels.

\* \* \* \* \*